United States Patent Office 3,842,087
Patented Oct. 15, 1974

---

3,842,087
1,8-NAPHTHYRIDINE COMPOUNDS
Haydn Windsor Richard Williams, Dollard des Ormeaux, and Clarence Stanley Rooney, Beaconsfield, Quebec, Canada, assignors to Merck Sharp & Dohme (I.A.) Corporation, Rahway, N.J.
No Drawing. Filed May 22, 1973, Ser. No. 362,994
Claims priority, application Canada, June 16, 1972, 144,973
Int. Cl. C07d 31/42, 31/44
U.S. Cl. 260—295 N         6 Claims

ABSTRACT OF THE DISCLOSURE

There is described 5,7-disubstituted-1,8-naphthyridin-2(1H)-one-8-oxide products with bronchodilating and hypotensive properties prepared by oxidizing 5,7-disubstituted-1,8-naphthyridin-2(1H)-one compounds.

---

This invention is concerned with 5,7-disubstituted-1,8-naphthyridin-2(1H)-one - 8 - oxide compounds and process for their preparation.

The novel compounds of this invention have the structural formula I

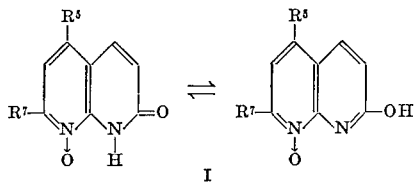

I wherein $R^5$ is selected from hydrogen, lower alkyl having from 1 to 5 carbon atoms, halo substituted lower alkyl, preferably trifluoromethyl and pentafluoroethyl, phenyl, thienyl and naphthyl, $R^7$ is selected from lower alkyl having from 1 to 5 carbon atoms and halo-substituted lower alkyl, preferably trifluoromethyl and pentafluoroethyl.

The 2-oxo products are keto-enol tautomers. However as the keto form is considered the more stable tautomer, the products herein will be named as 2-oxo compounds although those skilled in the art will realize that both tautomers may be present or any particular compound so named may exist as the enol or hydroxy tautomer and the following disclosure therefore is to be interpreted to incorporate all tautomeric forms.

The naphthyridine compounds of this invention have been found in animal studies to inhibit bronchial constriction induced by histamine and other constricting agents and are therefore useful as bronchodilating agents. As bronchodilating agents, the products of this invention have been found to have relatively low chronotropic effect as compared with known bronchial dilator agents. Additionally the products possess useful hypotensive properties.

The process aspect of our invention resides in oxidizing 5,7-disubstituted-1,8-naphthyridin-2(1H)-one compounds by conventional methods. Advantageously oxidation can be effected by dissolving the naphthyridine product in a suitable solvent and adding peroxide or urea-peroxide complex. The reaction mixture can be allowed to stand at ambient temperature for 24–48 hours or it can be heated up to reflux for from several hours to up to about 48 hours. Acetic acid can serve as solvent although when fluoroalkyl substituents are present, trifluoroacetic acid is preferred.

The naphthyridin-2(1H)-one compounds are prepared by the reaction of 2,6-diaminopyridine with the appropriate β-diketone to provide the 2-amino-5,7-disubstituted-1,8-naphthyridine compounds. The reaction is facilitated by warming up to the boiling point although in practice lower temperatures, up to 90–95° C., have been found to provide operable conditions. When $R^5$ and $R^7$ represent dissimilar substituents, the reaction sometimes forms both isomers. When two isomers are obtained they can readily be separated by conventional methods, conveniently by chromatographic separation on silica gel using ethyl acetate, methanol-benzene, acetone, as well as other known developing solvents. The 2-oxo compounds are obtained by treatment of the 2-amino compound with nitrous acid. The prior art procedure for converting 2-amino-1,8-naphthyridine compounds to the corresponding 2-oxo compound using dilute sulfuric acid and sodium nitrite was found to be inoperative for the compounds of this invention having a haloalkyl substituent attached to the naphthyridine nucleus. It was discovered, however, that for all of the products conversion of the 2-amino to the 2-oxo group could be effected by use of trifluoroacetic acid or pentafluoropropionic acid and an alkali metal nitrite, suitably sodium or potassium nitrite which provides the 2-oxo analog in good yield. Conversion takes place readily at ambient temperature. Slight warming would not, however, be contraindicated.

The process for making the novel compounds of this invention can be illustrated schematically as follows:

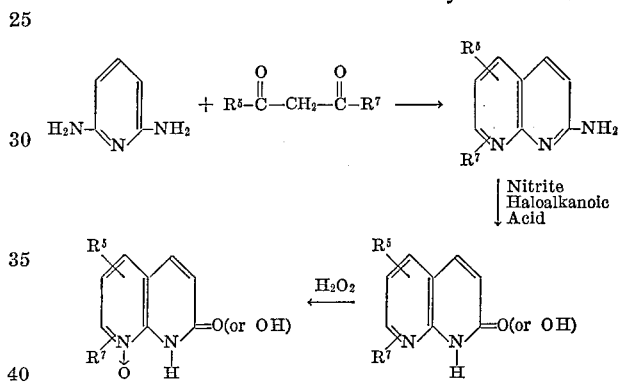

The following examples will provide details of the reaction conditions employed in preparing the compounds as well as illustrate the preparation of certain compounds falling within the scope of this invention.

EXAMPLE 1

5,7-Dimethyl-1,8-naphthyridin-2(1H)-one-8-oxide

A mixture of 5,7-dimethyl-1,8-naphthyridin-2(1H)-one (5.22 g., 30 mmole), 30% hydrogen peroxide (5.2 ml.) and acetic acid (150 ml.) is heated under reflux overnight. The reaction mixture is evaporated to dryness and the residue is recrystallized from methanol affording 4.4 g. (76%) of product, m.p. 257–260° C. Further recrystallization of the solid raises the melting point to 263–266° C.

Analysis calculated for $C_{10}H_{10}N_2O_2$ (percent): C, 63.18; H, 5.30; N, 14.28. Found (percent): C, 63.30; H, 5.47; N, 14.42.

EXAMPLE 2

7-Methyl-1,8-naphthyridin-2(1H)-one-8-oxide

By replacing the naphthyridine employed in Example 1 by an equivalent quantity of 7-methyl-1,8-naphthyridin-2(1H)-one and following substantially the same procedure described in Example 1 there is obtained 7-methyl-1,8-naphthyridin-2(1H)-one-8-oxide, m.p. 228–231° C., in 54% yield.

Analysis calculated for $C_9H_8N_2O_2$ (percent): C, 61.36; H, 4.58; N, 15.90. Found (percent): C, 61.34; H, 4.64; N, 15.98.

EXAMPLE 3

5,7-Di(trifluoromethyl)-1,8-naphthyridin-2(1H)-one-8-oxide

*Step A: Preparation of 2-Amino-5,7-di(trifluoromethyl)-1,8-naphthyridine*

A mixture of 2,6-diaminopyridine (5.2 g., 47.6 mmole), 1,1,1,5,5,5-hexafluoroacetylacetone (10.0 g., 48.0 mmole) and 85% phosphoric acid (50 ml.) are stirred for six hours in an oil-bath at 90–95° C. then left overnight at ambient temperature. The reaction mixture is poured into ice water and neutralized with ammonium hydroxide to pH 7, the solid collected, washed with water and dried to provide 9.0 g. (67%) of product, m.p. 198–204° C. Upon recrystallization from benzene, purified product separates in the form of pale yellow needles, m.p. 204–206° C.

Analysis calculated for $C_{10}H_5F_6N_3$ (percent): C, 42.72; H, 1.79; F, 40.54; N, 14.94. Found (percent): C, 42.77; H, 2.13; F, 40.33; N, 15.23.

*Step B: Preparation of 5,7-Di(trifluoromethyl)-1,8-naphthyridin-2(1H)-one*

2-Amino - 5,7 - di(trifluoromethyl)-1,8-naphthyridine, (5.60 g., 20 mmoles) is dissolved in trifluoroacetic acid (40 ml.). To the stirred, cooled (ice bath), solution is added finely powdered sodium nitrite (3.0 g., 43.5 mmoles) in small portions. Stirring is continued at room temperature for one hour, the mixture then poured into a crushed ice/water mixture (ca. 500 ml.), and the product filtered off and dried in an oven at 60° C. yielding 4.2 g. (75%) of crude product. Following purification by recrystallization from isopropyl ether there is obtained 3.4 g. (60%) of pure product, m.p. 182–184° C.

Analysis calculated for $C_{10}H_4F_6N_2O$ (percent): C, 42.57; H, 1.43; F, 40.40; N, 9.92. Found (percent): C, 43.02; H, 1.66; F, 40.25; N, 10.22.

*Step C: Preparation of 5,7-Di(trifluoromethyl)-1,8-naphthyridin-2(1H)-one-8-oxide*

5,7-Di(trifluoromethyl) - 1,8 - naphthyridin-2(1H)-one (4.02 g., 14.25 mmole) is dissolved in trifluoroactic acid (20 ml.) cooled in an ice bath. Concentrated sulfuric acid (24 ml.) is added followed a few minutes later by urea-hydrogen peroxide complex (2 g.). The mixture is stirred in the ice bath for 15 minutes and then at room temperature. Urea-hydrogen peroxide complex (1 g.) is added at hourly intervals (without cooling) until a total of 7 g. (i.e. 2+5) has been added and the reaction mixture allowed to stand for two days or until thin layer chromatography shows the absence of starting material. The mixture is poured onto ice (150 g.) and extracted with chloroform (2× 50 ml.). The chloroform extract is washed with water (20 ml.) to which 10% sodium carbonate is added in small portions to pH 4–4.5. When yellow solid crystallizes from the organic extract, the suspension is evaporated to dryness and the solid collected by slurrying with water (10 ml.) and filtering, yielding 3.03 g. (71%) of product, m.p. 171–176° C. after drying at 60° C. in air. The product is recrystallized from hot methyl chloroform (70 ml.). After filtering the hot solution, it is evaporated to about 25 ml. before collecting the product. After drying at 60° C. in air, 2.56 g. (60.2%) of product is obtained, m.p. 177–180° C. Further drying at 100°/0.005 mm. gives product with m.p. 179.5–180.5° C. Further recrystallization of the compound from methyl chloroform gives analytically pure compound crystallizing in small pale yellow needles, m.p. 180.5–181° C. after drying at 100° C./0.005 mm.

Analysis calculated for $C_{10}H_4F_6N_2O_2$ (percent): C, 40.29; H, 1.35; F, 38.23; N, 9.40; O, 10.73. Found (percent): C, 40.00; H, 1.17; F, 38.37; N, 9.52; O, 10.48.

EXAMPLE 4

5-Methyl-7-pentafluoroethyl-1,8-naphthyridin-2(1H)-one-8-oxide

*Step A: Preparation of 2-amino-5-methyl-7-pentafluoroethyl-1,8-naphthyridine and preparation of 2-amino 5-pentafluroroethyl-7-methyl-1,8-naphthyridine*

A mixture of 2,6-diaminopyridine (5.2 g., 4.76 mmole), 1,1,1,2,2-pentafluorohexane-3,5-dione (9.80 g., 4.80 mmole) and 85% phosphoric acid (50 ml.) is stirred at 90–95° C. for 6 hours. When cool, the reaction mixture is poured into ice-water and neutralized with ammonium hydroxide to pH 7. The crude product is a mixture of two isomeric compounds, 2-amino-5-methyl-7-pentafluoroethyl-1,8-naphthyridine and 2-amino-5-pentafluoroethyl-7-methyl-1,8-naphthyridine which are separated by chromatography on silica gel using ethyl acetate or carbon tetrachloride/chloroform as the solvent phase, and purified by recrystallizing the separated fractions from benzene.

*Step B: Preparation of 5-Methyl-7-pentafluoroethyl-1,8-naphthyridin-2(1H)-one*

2-Amino-5-methyl-7-pentafluoroethyl - 1,8 - naphthyridine (5.54 g., 20 mmole) is dissolved in trifluoroacetic acid (40 ml.) and to the stirred solution cooled to —5 to 0° C. is added finely powdered sodium nitrite (3.0 g., 43.5 mmole) in small portions. Stirring of the mixture is continued at room temperature for one hour, after which it is poured into ice-water (ca. 500 ml.). The product precipitates and is collected, washed and dried at 60° C. in air. It can be purified by recrystallization from di-isopropyl ether.

*Step C: Preparation of 5-methyl-7-pentafluoroethyl-1,8-naphthyridin-2(1H)-one-8-oxide*

This product is prepared by substantially the same procedure described in Example 3, Step C, employing 5-methyl - 7 - pentafluoroethyl-1,8-naphthyridin-2(1H)-one as starting material.

EXAMPLE 5

5-Pentafluoroethyl-7-methyl-1,8-naphthyridin-2(1H)-one-8-oxide

By replacing the naphthyridine compound used in Step B of Example 4, by an equivalent quantity of 2-amino-5 - pentafluoroethyl-7-methyl-1,8-naphthyridine and then following the procedures described in Example 4, Step B, and Example 3, Step C, there is obtained 5-pentafluoroethyl-7-methyl-1,8-naphthyridin-2(1H)-one-8-oxide.

EXAMPLE 6

5,7-Di(pentafluoroethyl)-1,8-naphthyridin-2(1H)-one-8-oxide

*Step A: Preparation of 1,1,1,2,2,6,6,7,7,7-decafluoroheptan-3,5-dione*

To a stirred suspension of potassium t-butoxide (44.8 g., 0.4 mole) in dry ether (400 ml.) is added ethyl pentafluoropropionate (76.8 g., 0.4 mole) over a period of about 15 minutes. Most of the solid dissolves. A solution of pentafluoroethyl methyl ketone (64.8 g., 0.4 mole) in dry ether (60 ml.) is added slowly, and after stirring the mixture for 2 hours at room temperature, it is allowed to stand overnight. A solution of glacial acetic acid (27.2 ml.) in water (120 ml.) is added with stirring and external cooling (ice-bath). Then a warm solution of copper acetate (56.0 g., 0.28 mole) in water (532 ml.) is added slowly with stirring and cooling. The ether is distilled off, and the copper salt of the product is collected by filtration, washed with water, drained thoroughly, and then washed with petroleum ether. The copper derivative is suspended in ether (200 ml.) and decomposed by treatment with 15% sulphuric acid (450 ml.). The aqueous layer is separated and extracted with more ether (3 × 50 ml.). The combined ethereal extract is dried, first over anhydrous sodium sulphate and then over anhydrous calcium sulphate. Evaporation of the ether gives the product which is purified by fractionational distillation at atmospheric pressure.

*Step B: Preparation of 2-amino - 5,7-di(pentanfluoroethyl)-1,8-naphthyridine*

A mixture of 2,6-diamino pyridine (5.2 g., 4.76 mmole), 1,1,1,2,2,6,6,7,7,7-decafluoroheptan - 3,5 - dione (14.5 g., 4.80 mmole) and 85% phosphoric acid (50 ml.) is stirred at 90–95° C. for 6 hours. When cool, the reaction mixture is poured into ice-water and neutralized with ammonium hydroxide to pH 7. The solid is collected, washed with water, dried, and can be purified by recrystallization from benzene.

*Step C: Preparation of 5,7 - di(pentafluoroethyl)-1,8-naphthyridin-2(1H)-one*

When an equivalent amount (7.62 g., 20 mmole) of 2-amino-5,7-di(pentafluoroethyl) - 1,8 - naphthyridine is used in place of the 2-amino-5-methyl-7-pentafluoroethyl-1,8-naphthyridine employed in Example 4, Step B, the product is 5,7 - di(pentafluoroethyl) - 1,8 - naphthyridin-2(1H)-one. Purification is effected by recrystallization of the crude product from a mixture of benzene and petroleum ether.

*Step D: Preparation 5,7-di(pentafluoroethyl)-1,8-naphthyridin-2(1H)-one-8-oxide*

This product is prepared by replacing the naphthyridine compound employed in Example 3, Step C, by an equivalent quantity of 5,7-di(pentafluoroethyl)-1,8-naphthyridin-2(1H)-one and then following substantially the same procedure described in Step C of Example 3.

EXAMPLE 7

5-(2-Thienyl)-7-trifluoromethyl-1,8-naphthyridin-2(1H)-one-8-oxide

*Step A: Preparation of 2 - amino-5-(2-thienyl)-7-trifluoromethyl-1,8-naphthyridine*

By replacing the 1,1,1,2,2-pentafluorohexane-3,5-dione employed in Example 4, Step A, by an equivalent quantity of 1-trifluoromethyl-5-(2 - thienyl)-propan-1,3-dione and following substantially the same procedure described in Step A of Example 4 there is obtained a 15.3% yield of product which melts at 256–258° C. after recrystallization from ethyl acetate.

Analysis calculated for $C_{13}H_{10}F_3N_3S$ (percent): C, 52.88; H, 2.73; N, 14.23; F, 19.30. Found (percent): C, 53.39; H, 2.84; N, 13.87; F, 19.26; C, 53.09; H, 2.95; N, 14.43 F, 19.24.

*Step B: Preparation of 5-(2-thienyl)-7-trifluoromethyl-1,8-naphthyridin-2(1H)-one*

Following substantially the same procedure described in Example 4, Step B, except 2-amino-5-(2-thienyl)-7-trifluoromethyl-1,8-naphthyridine is employed as starting material, the above product is obtained in 12% yield, m.p. 103° C., following recrystallization from ethyl acetate.

Analysis calculated for $C_{13}H_7F_3N_2OS$ (percent): C, 52.70; H, 2.38; F, 19.23; N, 9.45; S, 10.82. Found (percent): C, 53.17; H, 2.15; F, 19.41; N, 9.35; S, 11.08.

*Step C: Preparation of 5-(2-thienyl)-7-trifluoromethyl-1,8-naphthyridin-2(1H)-one-8-oxide*

Oxidation of 5-(2-thienyl)-7-trifluoromethyl-1,8-naphthyridin-2(1H)-one by substantially the same procedure described in Example 3, Step C, provides 5-(2-thienyl)-7-trifluoromethyl-1,8-naphthyridin-2(1H)-one-8-oxide.

The products identified in Table I are prepared by the methods described in Example 3, Steps A–C. The 2-amino products having the substituents 5- and 7- are prepared by replacing the 1,1,1,5,5,5-hexafluoroacetylacetone employed in Step A of Example 3 by an equivalent quantity of the β-diketone identified in the table. When a mixture of isomers is obtained they are separated by known chromatographic methods such as described herein and illustrated in Example 4, Step A.

TABLE I

| Ex. No. | $R^5$ | $R^7$ |
|---|---|---|
| 8 | t-Butyl | Trifluoromethyl. |
| 9 | Ethyl | Do. |
| 10 | Isobutyl | Do. |
| 11 | Isopropyl | Do. |
| 12 | 2-naphthyl | Do. |
| 13 | Isopentyl | Do. |
| 14 | Phenyl | Do. |

The products of this invention were found, when tested according to standard protocols in anesthetized dogs to inhibit bronchial constriction induced by one or more bronchoconstricting agents; a known procedure for evaluating the bronchodilating properties of products. In addition, the compounds were also found to exhibit hypotensive properties, probably due to their action as peripheral vasodilators and are therefore potentially useful for the treatment of hypertension. Intravenous or intraduodenal doses in the approximate dose range of 5 mg./kg. to 75 mg./kg. provided protection at the $ED_{50}$ level against the induced bronchoconstriction in most animals challenged. Those compounds that also exhibited hypotensive properties were effective within the same dosage range.

The invention further provides pharmaceutical compositions comprising, as active ingredient, at least one of the compounds according to the invention in association with a pharmaceutical carrier or excipient to which other active ingredients can be added, if desired. The products or products may be presented in a form suitable for application orally (such as capsules, tablets or liquid preparations), or for parenteral administration (in the form of solutions or suspensions) or in aerosols prepared by conventional methods. For example, a capsule can be prepared by conventional methods employing lactose as an excipient and containing per unit dosage 10–25 mgs. of active compound. Unit dosages can range between about 5 to 100 mg. for administration as prescribed by the physician.

While the invention has been illustrated by certain specific members of the novel 1,8-naphthyridine products made by certain specific methods and formulated into certain specific dosage forms, it is to be understood that the invention is not to be considered limited by or to the specific embodiments illustrated but is to encompass other members of the novel products falling within the scope of the generic disclosure and claims as well as other methods or modifications of the methods described for their preparation and other formulations, all of which would be obvious in view of the teaching herein to one skilled in the art.

What is claimed is:

1. A 1,8-naphthyridin-2(1H)-one-8-oxide having structure I:

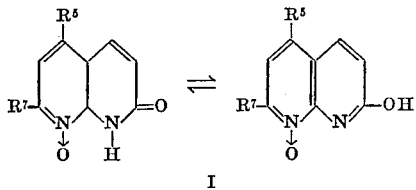

wherein $R^5$ represents hydrogen, lower alkyl, trifluoromethyl, pentafluoroethyl, phenyl, thienyl or naphthyl; $R^7$ represents lower alkyl, trifluoromethyl or pentafluoroethyl.

2. A compound as claimed in claim 1 wherein $R^5$ and $R^7$ are each trifluoromethyl.

3. A compound as claimed in claim 1 wherein $R^5$ is hydrogen and $R^7$ is methyl.

4. A compound as claimed in claim 1 wherein $R^5$ is methyl and $R^7$ is trifluoromethyl.

5. A compound as claimed in claim 1 wherein $R^5$ is trifluoromethyl and $R^7$ is methyl.

6. A compound as claimed in claim 1 wherein $R^5$ and $R^7$ are each methyl.

References Cited
UNITED STATES PATENTS

| | | | |
|---|---|---|---|
| 1,755,515 | 4/1930 | Rath | 260—296 N |
| 2,226,111 | 12/1940 | Binz et al. | 260—296 N |
| 2,517,929 | 8/1950 | Richter | 260—296 N |

ALAN L. ROTMAN, Primary Examiner

U.S. Cl. X.R.

260—294.8 C, 296 N; 424—263, 266